Feb. 8, 1927. 1,616,435
E. A. ALLISON
COOKING UTENSIL
Filed April 14, 1926 2 Sheets-Sheet 1
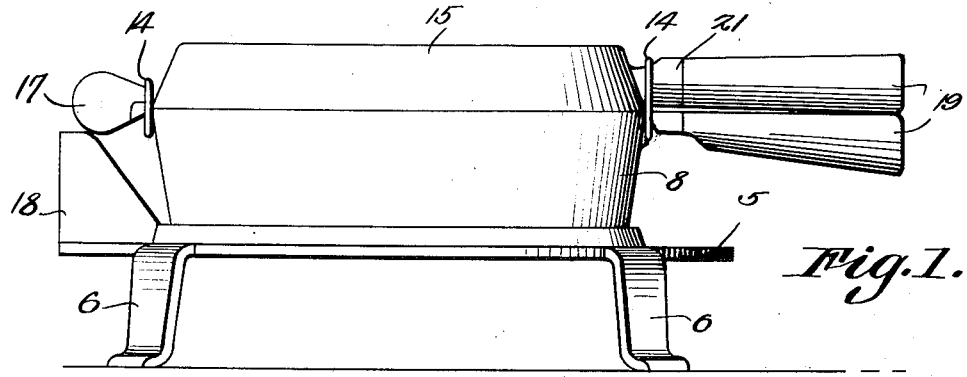
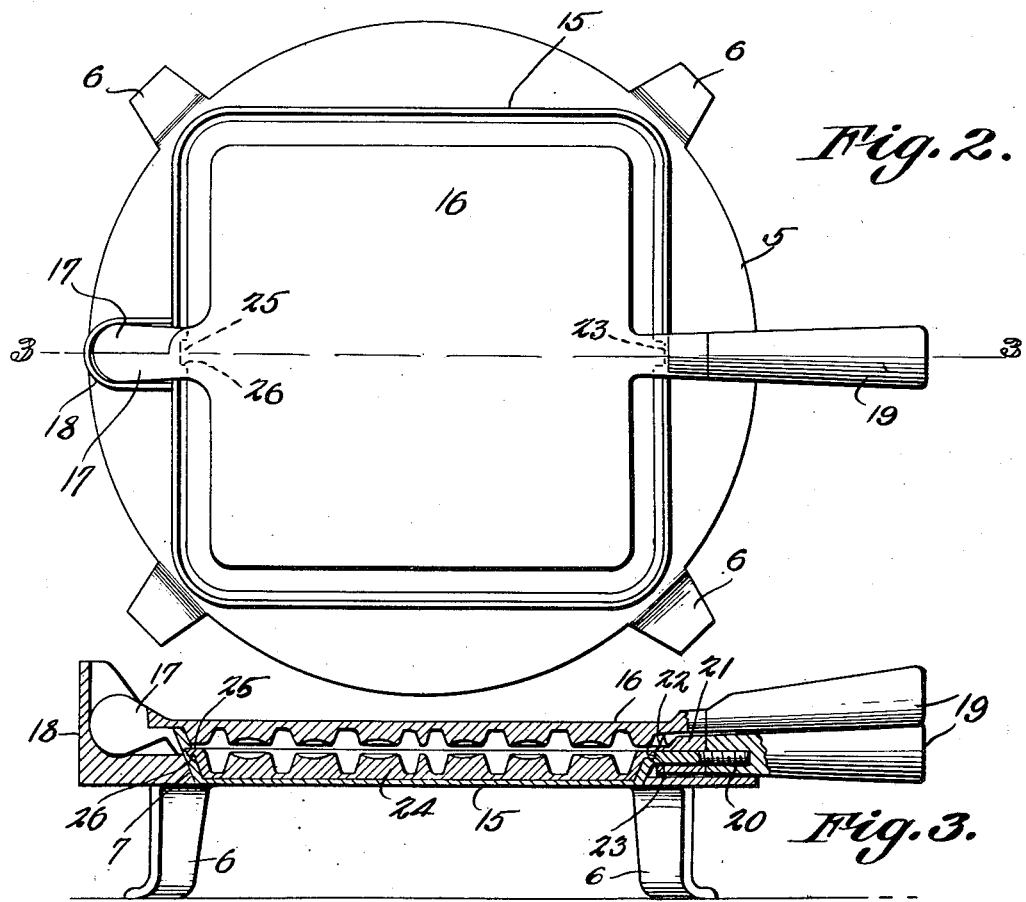
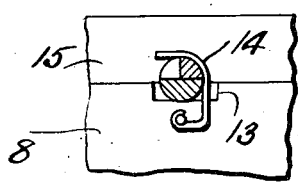
E. A. Allison Inventor Feb. 8, 1927.

E. A. ALLISON 1,616,435

COOKING UTENSIL

Filed April 14, 1926   2 Sheets-Sheet 2

E. A. Allison
Inventor,

By C. A. Snow & Co.
Attorneys.

Patented Feb. 8, 1927.

1,616,435

UNITED STATES PATENT OFFICE.

EARNEST A. ALLISON, OF EUREKA, CALIFORNIA.

COOKING UTENSIL.

Application filed April 14, 1926. Serial No. 102,063.

This invention relates to cooking utensils, and aims to provide a combination utensil which may be efficiently employed as a waffle iron, steamer or skillet for frying purposes.

The primary object of the invention is to provide a device so constructed that by inverting the cover of the steamer, the cover may be employed as a skillet, and that by inserting a waffle iron section in the skillet, the device may be used as a waffle iron.

A still further object of the invention is to provide a cooking utensil of this character which when stored will require small space to the end that the device may be efficiently carried on camping or outing trips.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a cooking utensil constructed in accordance with the invention.

Figure 2 is a plan view of the device assembled for use as a waffle iron.

Figure 3 is a sectional view taken on line 3—3 of Figure 2.

Figure 4 is a sectional view taken on line 4—4 of Figure 5.

Figure 5:
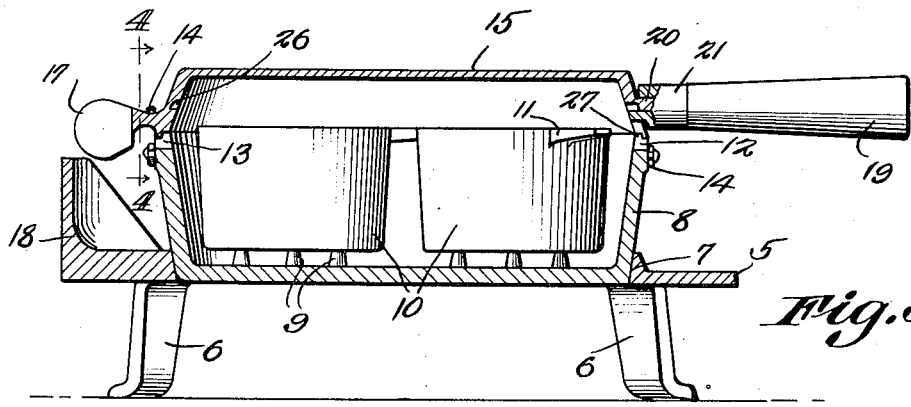
Figure 5 is a sectional view of the device when assembled for use as a steam oven.

Referring to the drawings in detail, the reference character 5 indicates the base of the utensil which is provided with legs 6 to support the base in spaced relation with the burner or blaze of the fire with which the utensil is used.

As shown, the base is formed with an opening the wall of the opening being inclined as at 7 to conform to the inclined wall of the member 8 that is shown as fitted therein, the member 8 being a substantially deep receptacle to be employed as a steamer for steaming custards or the like.

As illustrated by Figure 5, lugs 9 are formed integral with the bottom of the member 8 and extend upwardly therefrom, which lugs are adapted to support the cups 10 in spaced relation with the bottom of the member 8 so that the contents of the cups 10 will not be subjected to the direct heat of the burner or blaze thereunder.

Figure 6:
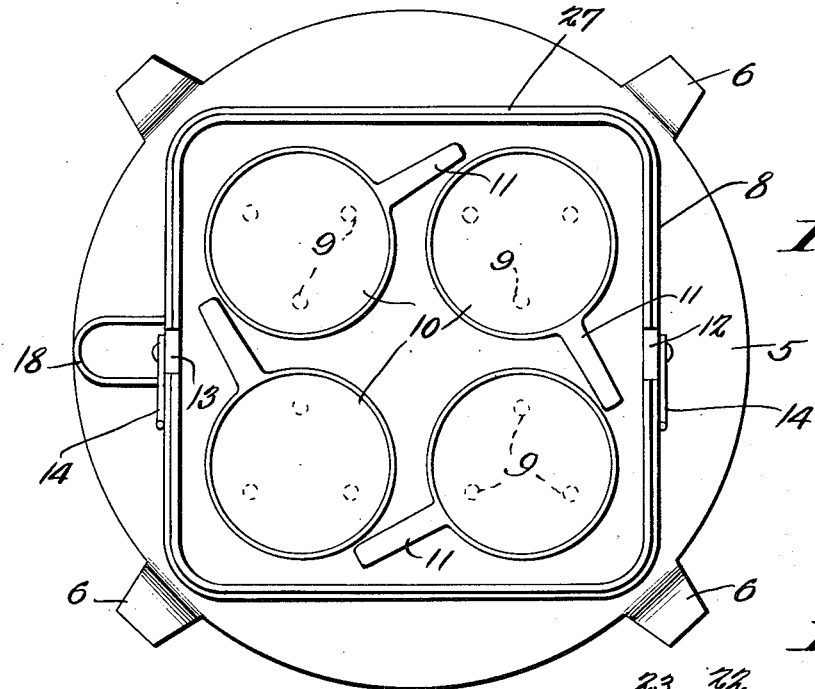
Figure 6 is a plan view of the steamer, the cover having been removed.
Figure 8:
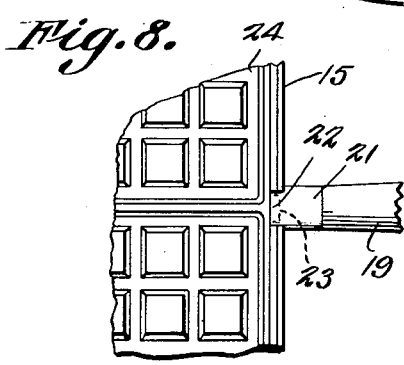
Figure 8 is a fragmental plan view showing one of the waffle iron sections removed.
Figure 7:
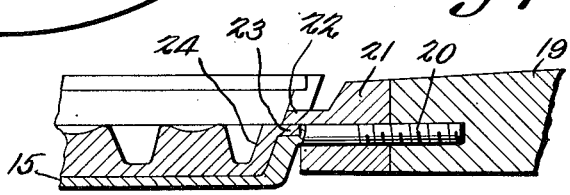
Figure 7 is an enlarged fragmental sectional view illustrating the movable waffle iron securing means.

In the use of the device, these cups are contemplated to be used in sets of four, but it is to be understood that the number of cups may be varied to meet various requirements, and to facilitate the positioning and removal of the cups, the cups are provided with handles 11 as clearly shown by Figure 6 of the drawings.

Formed in the upper edge of the member 8 and disposed directly opposite each other are cut out portions 12 and 13 respectively, the cut out portions 12 and 13 being provided to receive the handle, and supporting lugs of the waffle iron to be hereinafter more fully described.

Swinging hook members indicated at 14 are provided adjacent to these cut out portions and are adapted to be swung upwardly into engagement with the handles or lugs to hold the waffle iron which is employed as the cover for the member 8, in position.

The waffle iron which is shown more clearly by Figure 3 of the drawings, embodies the lower section 15 and upper section 16, each of which sections is provided with a supporting lug indicated at 17, which are adapted to rest in the extension 18 formed integral with the base 5 to insure against lateral movement of the waffle iron while in use.

Each of these sections of the waffle iron is provided with a handle indicated at 19 and as shown by Figure 3, the handle of the lower section 15 is formed with a threaded bore to accommodate the threaded extension 20 of the section 15, which handle is adapted to engage the slidable fastening member 21 that has a finger 22 adapted to engage the extension 23 of the waffle plate 24 to hold the waffle plate within the section 15.

At the opposite end of the plate 24 is provided an extension 25 that is adapted to fit into the recess 26 formed in one wall of the section 15, to the end that when the plate 24 is positioned, it will be securely held within the section 15 and the section 15 may be employed as a waffle iron section.

It is obvious that when the utensil is to be employed as a steamer, the handle 19 may be unscrewed to release the fastening member 21 whereupon the plate 24 may be lifted from its position within the section 15 and positioned over the member 18 as shown by Figure 5.

The upper edge of the section 15 is formed with a cut out portion so that it will fit over the flange 27 formed by cutting away the outer upper edge of the receptacle 8.

Should it be desired to use the section 15 as a skillet or frying pan, the plate 24 is removed, whereupon the section 15 may be fitted in the opening of the base 5.

From the foregoing it will be obvious that due to the construction as shown and described, a combination cooking utensil is provided, and one which may be used for a variety of purposes in cooking.

I claim:

1. A combination cooking utensil including a base, a waffle iron including an upper section and a lower section positioned within the base, said lower section having a recessed portion formed therein, a waffle plate having an extension adapted to be fitted in the recessed portion, a movable securing member having an extension adapted to overlie a portion of the plate to secure the plate in position, and handles forming a part of the waffle iron.

2. A combination cooking utensil including a base, a waffle iron including an upper section and a lower section, a removable waffle plate in the lower section, said waffle plate adapted to be removed to permit the lower section to be used as a frying pan, and a supporting lug carried by the waffle iron to support the waffle iron on the base.

3. A combination cooking utensil including a base, a substantially deep receptacle adapted to be positioned on the base, a waffle iron section having a removable waffle plate, and said waffle iron section adapted to be positioned over the substantially deep receptacle to provide a cover when the removable plate has been removed.

4. A combination cooking utensil including a base, a waffle iron embodying an upper section and a lower section, a removable waffle plate in the lower section, a threaded extension forming a part of the lower section, a handle positioned on the threaded extension, a movable securing member mounted on the threaded extension and having an extension adapted to overlie the removable waffle plate to secure the removable waffle plate in position, and said handle adapted to be rotated to force the securing member to its active position.

In testimony that I claim the foregoing as my own, I have hereto affixed my signature.

EARNEST A. ALLISON.